June 13, 1967 — J. W. McDONALD — 3,324,696
FLANGE TURNING MACHINE
Filed Nov. 18, 1964 — 3 Sheets-Sheet 1
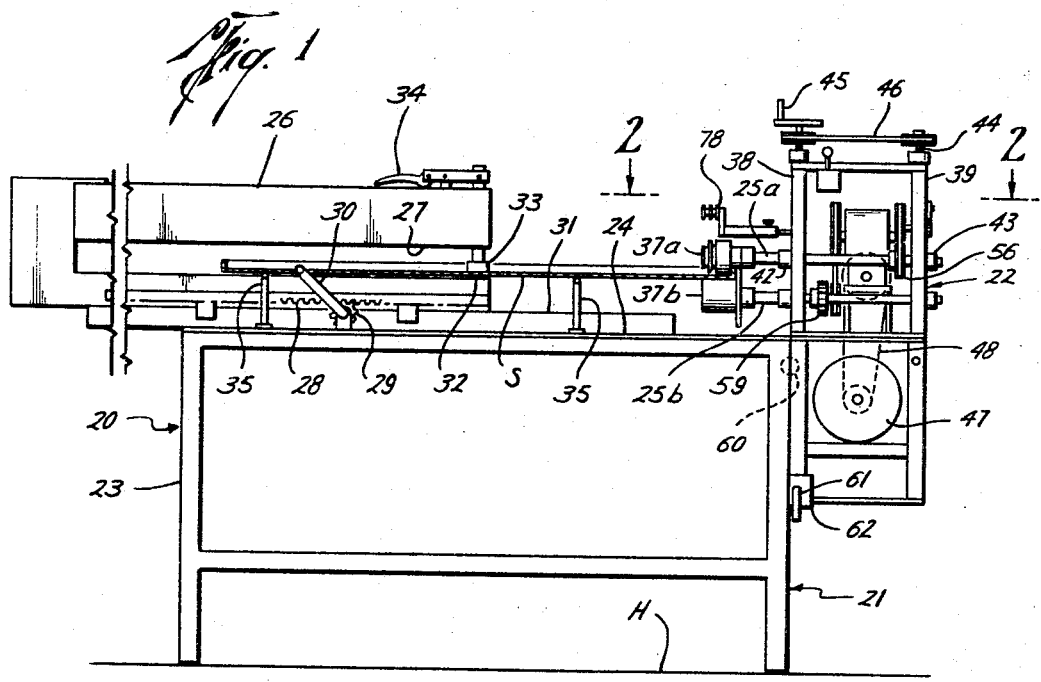
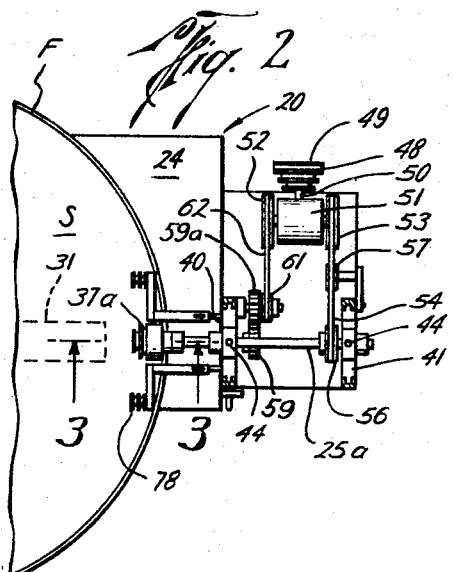
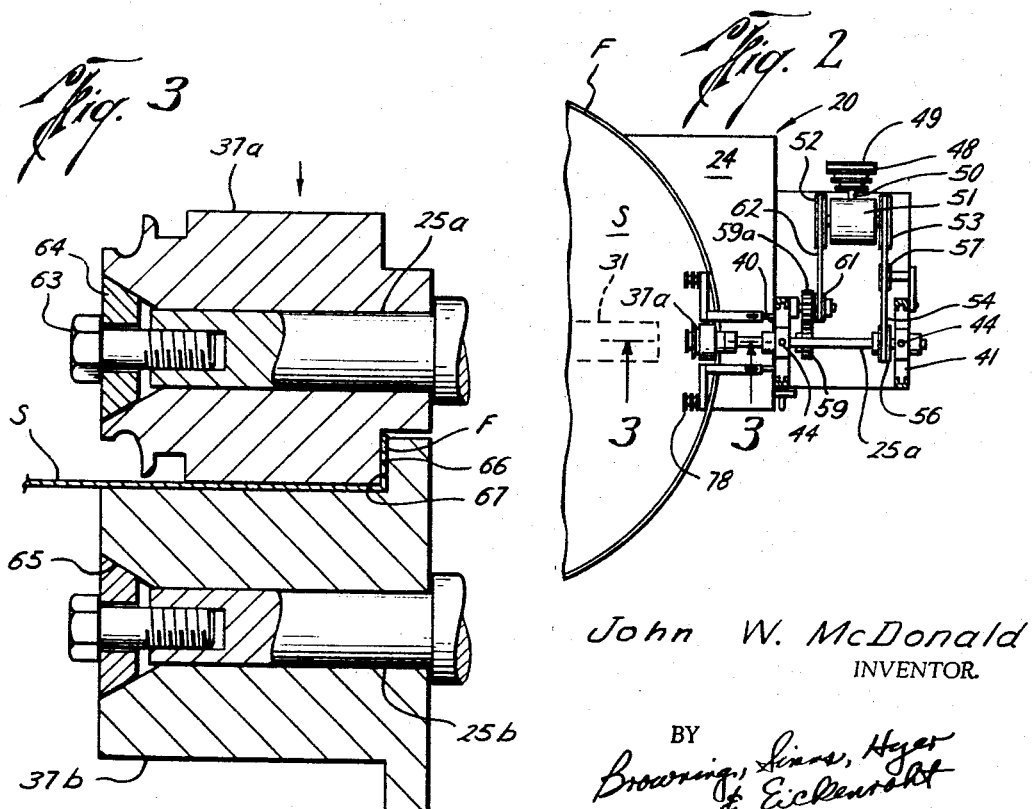
John W. McDonald
INVENTOR.
BY Browning, Simms, Heyer & Eickenroht
ATTORNEYS

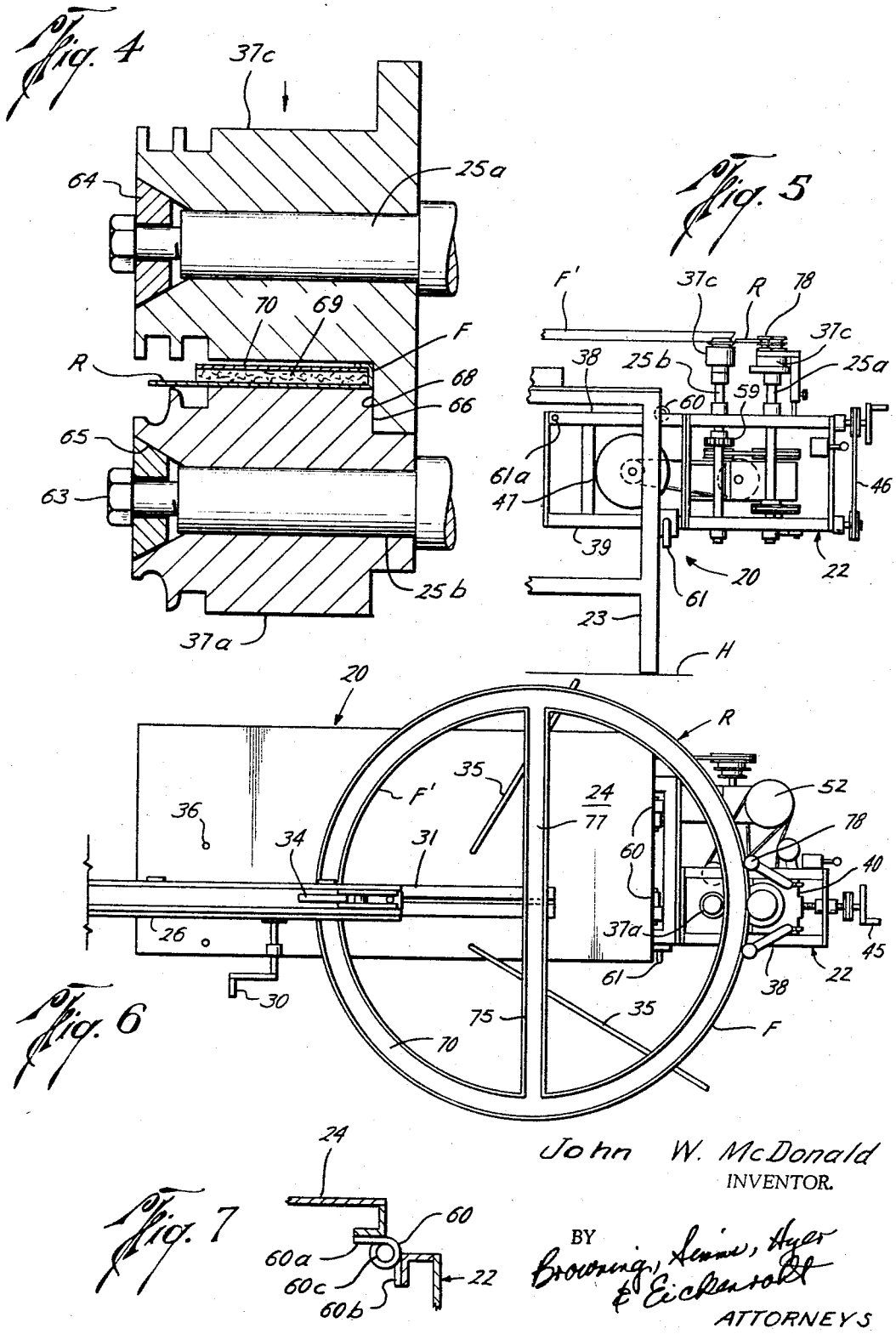

June 13, 1967

J. W. McDONALD 3,324,696

FLANGE TURNING MACHINE

Filed Nov. 18, 1964

John W. McDonald
INVENTOR.

BY
Browning, Simms, Hyer
& Eickenroht
ATTORNEYS

United States Patent Office 3,324,696
Patented June 13, 1967

3,324,696
FLANGE TURNING MACHINE
John W. McDonald, 5102 Ditmas,
Houston, Tex. 77021
Filed Nov. 18, 1964, Ser. No. 412,147
7 Claims. (Cl. 72—85)

This invention relates generally to a machine for turning flanges on a sheet of metal or like work piece. In particular, it relates to an improved machine for use in forming a sheet metal ring having flanges turned on its inner and outer peripheries.

Many heat exchangers and other large equipment require ring gaskets which are often as large at 40 or 50 inches in diameter. One type of gasket which has been found quite satisfactory for this purpose comprises a relatively flat ring of asbestos within a sheet metal cover or jacket. In the manufacture of such gaskets, the inner and outer peripheries of a ring of sheet metal are turned up and over upon the inner and outer peripheries of the asbestos ring.

In many cases, this type of gasket has one or more reinforcing strips which extend across the opening through it. In the fabrication of these gaskets, a strip of asbestos is formed integrally with the asbestos ring and a strip of sheet metal is formed integrally with the sheet metal ring. These strips are aligned with one another in the turning of flanges on the inner and outer peripheries of the sheet metal ring, and the opposite side edges of the metal strip are then turned up and over upon the adjacent edges of the asbestos strip so that it is also covered.

In the past, the flanges on the inner and outer peripheries of the sheet metal of such gaskets have been turned between rollers fittable over and rotatable with horizontally extending, parallel shafts mounted on a head to one side of a base for supporting the sheet. More particularly, a circular sheet from which the ring is to be formed is supported in a horizontal position on the base in a manner to permit it to rotate about its center as its outer periphery is pulled between flange forming surfaces on the rotating rollers which cause the outer periphery of such sheet to be forced up and then down.

If this machine is used for turning a flange on the inner periphery of a ring cut from the sheet, such ring must be turned vertically on end to permit the flange on its outer periphery and its unformed inner periphery to be received between flange forming surfaces on another set of rollers on the horizontally disposed shafts. At this time, the shafts are again rotated to cause the ring to be pulled through the rollers so as to turn a flange up and then down on the inner periphery of the sheet metal ring. However, this has proven to be a difficult procedure in the manufacture of larger gaskets, particularly of the size previously mentioned, because of the difficulty in holding the ring upright as it is pulled between the rotating rollers.

It has not been possible to turn flanges on reinforcing strips with this type of machine, because of the interference which would occur between the partially formed gasket and the machine base. That is, in order to perform this flange turning operation, it would be necessary to lower the upright ring a distance dependent upon the level of the strip and this of course is limited by the top of the base. Consequently, these latter flanges have either been turned by hand or with a machine different from that above described.

It is therefore an object of this invention to provide a machine of this general type in which the flange about the inner periphery of a sheet metal ring may be turned without the necessity of holding the ring vertically on edge, and more particularly in which it may be turned while the ring is supported horizontally on the base of the machine and at substantially the same level it is held during turning of a flange on its outer periphery.

Another object is to provide a machine of this general type in which flanges on opposite edges of a reinforcing strip across the opening through such a sheet metal ring may be turned without major alterations to the base of the machine, and preferably with the ring supported generally horizontally on the base.

A further object is to provide such a machine which is capable of accomplishing both of the foregoing operations with only a minor modification to the basic structure of prior machines.

In the drawings, wherein like reference characters are used throughout to designate like parts:

FIG. 1 is an elevational view of one side of a machine constructed in accordance with the present invention, and with a circular sheet of metal supported on the base of the machine for rotation about its center and with its outer periphery received between rollers on the rotatable shafts of the head of the machine to one side of the base so as to enable a flange to be turned up about such outer periphery;

FIG. 2 is a partial view of the top of the machine and sheet, as seen along broken line 2—2 of FIG. 1;

FIG. 3 is an enlarged sectional view of the rollers shown in FIGS. 1 and 2 with the outer periphery of the sheet received therebetween, as seen along broken line 3—3 of FIG. 2;

FIG. 4 is an enlarged sectional view of another set of rollers on the same shafts of the head and with a ring of asbestos laid upon a ring cut from the sheet of metal received between such rollers during turning down of the flange of the ring onto such asbestos ring;

Figure 8:
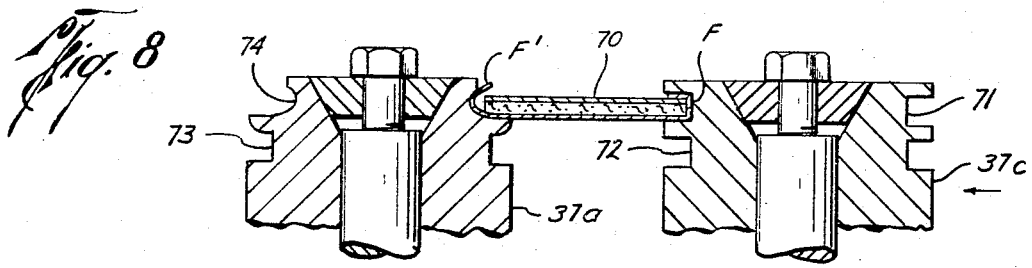
Figure 9:
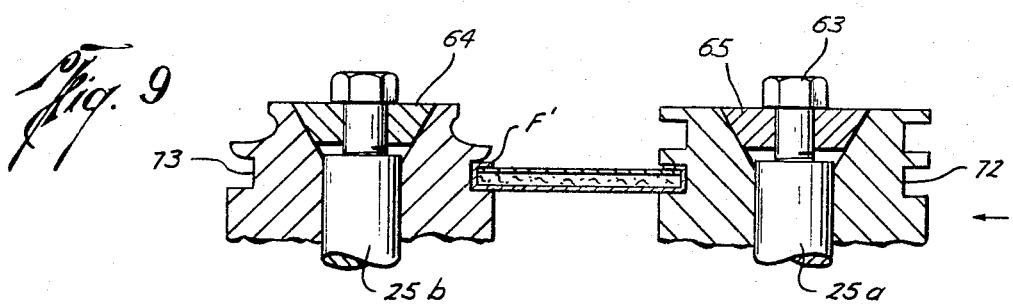
Figure 10:
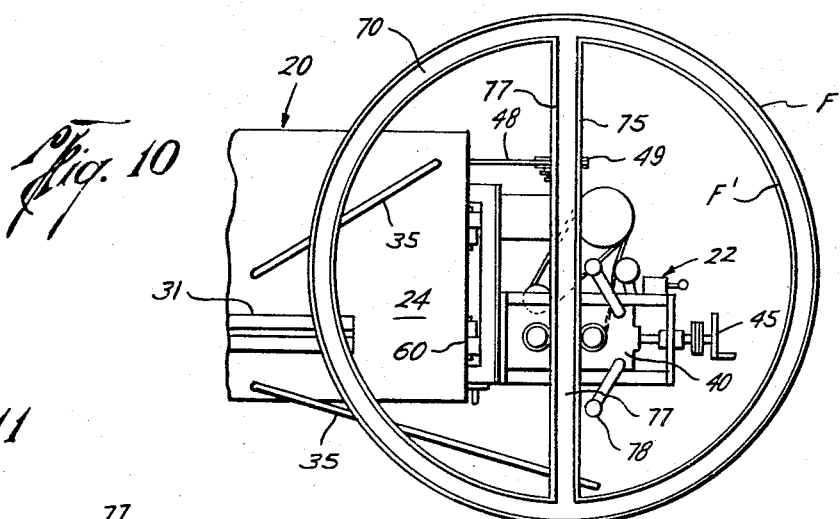
Figure 11:
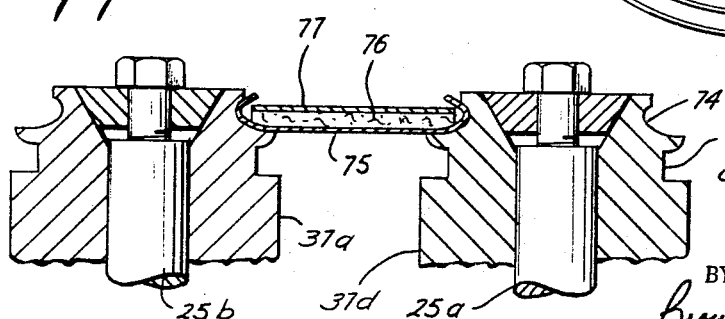

FIG. 5 is a partial elevational view of the side of the machine shown in FIG. 1, but with the head thereof swung into a position to dispose the parallel shafts with their axes extending in a vertical direction, and with the partially formed ring supported horizontally on the base with its inner periphery and the flange on its outer periphery disposed between grooves about the rollers on the shafts during turning up of a flange on the inner periphery;

FIG. 6 is a partial view of the top of the machine similar to FIG. 2, but with the head thereof in the position of FIG. 5 and with the partially formed ring supported horizontally on the base, as also shown in FIG. 5;

FIG. 7 is an enlarged sectional view of a hinge between the head and base of the machine by means of which the head is swung between the positions of FIGS. 1 and 5;

FIG. 8 is a sectional view on an enlarged scale of the rollers and partially formed ring disposed therebetween, as shown in FIGS. 5 and 6;

FIG. 9 is a view similar to FIG. 8, but with the ring moved from between upper grooves in the rollers to lower grooves therein so as to enable the flange on its inner periphery to be turned down as the ring is pulled between the lower grooves;

FIG. 10 is another view of the top of the machine, but with the ring supported horizontally on the base with the opposite edges of a sheet metal strip extending across the opening through the ring received between a further set of rollers on the vertically disposed shafts of the head so as to enable flanges to be turned up on the opposite edges of the strip; and FIG. 11 is an enlarged sectional view of the rollers and reinforcing metal strip received between them, as seen in FIG. 10, and also illustrating the strip of asbestos over which the metal flanges are to be turned.

With reference now to the details of the above described drawings, the machine 20 comprises a base 21 including a table 23 having upright legs adapted to be supported on the horizontal surface H and a head 22 on one side of the table. The top 24 of the table is disposed substantially parallel to the surface H and thus on a generally horizontal level. The head 22 has a pair of parallel shafts 25a and 25b rotatably mounted thereon and is connected to the table of the base for swinging between positions in which the shafts extend substantially parallel to the top 24 (FIGS. 1 and 2) of the table 23 and substantially perpendicular thereto (FIGS. 5, 6 and 10). In either of the positions, the ends of the shafts are adapted to receive the forming rollers disposed at a horizontal level above that of table top 24.

The base 21 includes a U shaped holder 26 having an opening 27 between its legs which faces the head 22. More particularly, this opening is on substantially the same horizontal level as the ends of the shafts 25a and 25b in either of the positions thereof. Thus, in the initial forming of the gasket or like article, and as shown in FIG. 1, a sheet S of metal may be supported on the base 20 with its left half disposed within the opening 27 and the outer peripheral edge of its right half received between rollers on the ends of the horizontally disposed shafts 25a and 25b. Similarly, in a subsequent step of forming the gasket and as shown in FIGS. 5 and 6, the partially formed ring R may be supported on the base with at least part of its left half disposed with the holder opening 27 and its inner and outer peripheral portions received between rollers on the ends of the vertically disposed shafts.

As best shown in FIG. 1, there is a clamp on the open end of holder opening 27 which includes a pin 32 on the lower leg of the holder and a plunger 33 on the upper leg thereof which is vertically reciprocal on the upper leg by means of a lever 34 to hold the center of sheet S down on the pin. Alternatively, of course, the plunger may be raised from the sheet to permit it to be removed from or otherwise shifted in position within the opening 27. While it is supported in this position on the base, overhanging portions of the sheet S may be supported by means of rods 35 on the top 24 of the table 23. As shown in FIG. 6, the inner ends of these rods are rotatably mounted within holes 36 in the top to permit them to swing about the vertical axes and thus to adjust to different sizes of sheets.

There is a rack 28 along the bottom leg of the holder which is engaged by a pinion 29 supported on the top 24 of the table 23. The pinion is rotated by means of a hand crank 30 to move the holder laterally across a raised guideway 31 on the table top. This of course permits the operator to fit the machine to different sizes of sheets by bringing the peripheries of the sheets into the desired positions relative to the rollers on the shafts.

As shown in FIG. 1, a roller 37a is fitted over the outer end of shaft 25a and a roller 37b is fitted over the outer end of shaft 25b. As will be described to follow, these rollers have outer surfaces which are so contoured that when they confront one another with the outer periphery of the sheet S therebetween, they will turn a flange upwardly on such periphery. More particularly, the rollers are rotatable with the shafts and the shafts are caused to rotate in opposite directions so that when engaged with opposite sides of the periphery on which the flange is being turned, they will pull the sheet between them and about its center to thereby gradually turn the flange about the entire periphery of such sheet.

The head 22 comprises a framework having laterally spaced apart pairs of posts 38 and 39 between which spaced apart portions of the shafts 25a and 25b are rotatably supported. More particularly, the lower shaft 25b rotates about a fixed axis, while the upper shaft 25a is carried by ways 40 and 41 (see FIG. 2) which move upwardly and downwardly between the posts 38 and 39, respectively. For this purpose, shaft 25a is carried within bearings 42 and 43 in the ways, and each way is raised and lowered by means of a threaded post 44 adapted to be rotated by means of a handwheel 45 at the upper end of the head 22. Thus, as shown in FIG. 1, the rotation of the handwheel 45 is imparted to the left-hand post and then to the right-hand post by means of a belt 46 extending between pulleys on the upper ends of the two posts.

As shown in FIG. 1, a reversible electrical motor 47 carried within the framework of the base 22 has an output shaft connected by a belt 48 to a pulley 49 on the rear side of the framework (see FIG. 2). This pulley in turn is connected to shaft 50 of a transmission 51 for in turn rotating pulleys 52 and 53 mounted on shafts extending from opposite sides of the transmission. The right-hand pulley 53 shown in FIG. 2 is connected to shaft 25a by means of belt 54 and pulley 56. An idler pulley 57 is swingably mounted on the framework of the base to permit taking up of slack in the belt 54 as the upper shaft 25a is raised and lowered with the ways 40 and 41. The lower fixed shaft 25b is rotated by means of a gear 59 thereon which meshes with a gear 59a which is in turn driven by a shaft having pulley 61 thereon and connected to pulley 52 by means of belt 62. Of course, this arrangement causes the shafts 25a and 25b to be rotated in opposite directions.

The head 22 is connected to the table 23 of the base 21 by means of a hinge 60 which is indicated diagrammatically by the broken lines in FIG. 1. As shown in the detail view of FIG. 7, this hinge comprises a first hinge part 60a connected to the table, a second hinge part 60b connected to a side of the framework of the head 22, and a hinge pin 60c connecting the hinge parts to one another. The head is held in the position of FIGS. 1 and 2, and thus with the shafts 25a and 25b extending parallel to the top 24 of the base by means of a pin 61 which is carried within an opening in flange 62 on the right-hand side of a leg of the table 23 for fitting within a hole 61a in the framework of the base. Obviously, upon removal of the pin 61, the head is free to swing into the position shown in FIGS. 5 and 6 wherein the shafts extend perpendicularly to the top 24 of the table. Due to the concentration of weight on that portion of the framework to the right of the hinge 60, the head will be maintained in this position until such time that it is raised back to the position of FIG. 1.

As shown in FIG. 1, the center of the circular sheet S is clamped to the holder 26 and the holder is moved laterally of the table of the base so as to dispose the peripheral portion of the sheet S between the rollers 37a and 37b. At this time, of course, the upper roller 37a has been raised on the shaft 25a so as to receive the peripheral portion of the sheet between it and the lower roller 37b. At this time, the roller 37a is moved downwardly until it engages the sheet and begins to form it by pressing it between the rollers 37a and 37b.

As shown in FIG. 3, each of the rollers 37a and 37b is releasably mounted on the outer end of its shaft by means of a conical wedge 64 which is drawn tightly into a similarly shaped socket 65 on the outer end of the roller by means of a bolt 63 threaded into the outer end of the shaft. As shown in FIG. 3, the outer portion of each shaft is reduced in diameter to form an outwardly facing shoulder against which the roller is forced upon taking up of the bolt 63.

As also shown in FIG. 3, the inner end of the roller 37a is reduced to form an outwardly facing shoulder 66, while the inner portion of the roller 37b is enlarged to form an outwardly facing shoulder 67. More particularly, these shoulders are so arranged as to form an annular space between them of a thickness approximating the thickness of the sheet S. Thus, when the upper roller 37a is brought down upon the peripheral portion of the sheet S, the shoulders 66 and 67 will bend a flange F up between them.

Initially, of course, the roller 37a is not brought all the way down upon the roller 37b, so that the flange is only partially turned up. The rollers are then caused to rotate in opposite directions by rotation of the shafts 25a and 25b in the manner previously described. This, of course, will cause the peripheral portion of the sheet S to move between the rollers and about its clamped center. In this manner, flange F is bent up about the entire outer peripheral portion of the sheet S.

Upon turning up of the flange F, shaft 25a is raised to lift roller 37a so that sheet S may be removed. Roller 37a is replaced by another roller 37c, and then substituted for roller 37b on shaft 25b. As shown in FIG. 4, the roller 37c of this second set of rollers has an enlarged inner end to provide a shoulder 68 which fits closely against the shoulder 66 on roller 37a.

Prior to turning down of the flange F by means of the rollers 37a and 37c, one or more holes are cut concentrically within the sheet S to form it into a ring R. More particularly, and as shown in FIG. 6, substantially semi-circular cuts are made in the sheet to form a strip 75 diametrically across its opening. Also in the formation of the type of gasket previously described, a ring of asbestos 69 is laid down upon the outer peripheral portion of the ring R with its outer periphery disposed adjacent to flange F and its inner periphery spaced radially outwardly from the inner periphery of the sheet metal ring R. More particularly, the asbestos ring is oriented about the metal ring to align a strip 76 of the asbestos with the metal strip 75. A ring-shaped shield 70 of substantially the same radial extent as that of the asbestos ring 69 is laid over the top of the asbestos ring as shown in FIG. 4. This may also include a strip 77 for covering the asbestos strip 76.

At this time, the upper roller 37c may be moved downwardly with upper shaft 25a so that the intermediate peripheral surface of the roller 37c adjacent the shoulder 68 thereon engages the top of the flange F and forces it downwardly against the top of cover or shield 70. Again, of course, the rollers are rotated in opposite directions to turn the flange progressively about the entire outer periphery of the ring. During this latter operation, the ring is clamped at the center of the strips of asbestos and metal extending across it.

When the flange F has been turned down in the manner above described and shown in FIG. 4, the roller 37c is raised and the partially formed ring R is removed from between the rollers 37a and 37c. The pin 61 is then removed from hole 61a and the head 22 is swung from the position of FIGS. 1 and 2 into the positions of FIGS. 5 and 6. As can be seen from the drawings, when the head is so swung, the lower portion of the base framework, as seen in FIG. 5, fits between the right-hand legs of the table 23.

In this latter position, the rollers on the ends of the shafts 25a and 25b are displaced to the right of the end of the table 23. Thus, in order to dispose the inner and outer peripheries of the partially formed ring between the rollers, as shown in FIGS. 5 and 6, it is necessary to shift the entire ring to the right and thus to move its center from the clamp on the holder 26. Nevertheless, a ring having this diameter at least some of the left-hand portion of the ring is disposed within the opening 27 in the holder, so that it is important that the portions on the rollers for forming the flange on the inner periphery of the ring be disposed on substantially the same horizontal level as were the forming shoulders 66, 67 and 68 between the rollers shown in FIGS. 3 and 4. On the other hand, inasmuch as the inner and outer peripheries are contained or held between the spaced apart rollers, as shown in FIGS. 5 and 6, there is no need for the ring to be held as by the clamp on the holder 26. Thus, the ring merely rests upon the base and extends from within the opening 27 in the holder, and its intermediate portion is supported by the rods 35 which are swung about their pivotal mountings on the table 23 to the desired position (see FIG. 6).

In the turning of the flange on the inner periphery of the ring R, the roller 37c on shaft 25a is moved away from the roller 37a, or to the right as shown in FIGS. 5 and 6, a distance sufficient to permit the partially formed ring to be disposed between the two rollers. When the ring is so disposed and supported horizontally on the base, the shaft 25a is moved back to the left so as to cause the roller 37c to move into engagement with the flange F and thus force the unturned inner peripheral portion of the ring against the roller 37a.

As shown in FIGS. 8 and 9, roller 37c has upper and lower peripheral grooves 71 and 72, respectively, about its end, and the roller 37a, on the other hand, has a lower groove 73 thereabout of substantially rectangular configuration and an upper groove 74 which is rounded about its base and shorter on its upper side than on its lower side. In the operation above described, and as shown in FIG. 8, the flange F is received in the upper groove 71 of the roller 37c while the unturned inner peripheral portion of the ring is received within the upper curved groove 74 of the roller 37a. As the roller 37c is moved toward the roller 37a, the inner peripheral portion of the ring is caused to turn up and bend toward the outer periphery of the ring, as illustrated in FIG. 8. At the same time, the rollers are rotated in opposite directions by rotation of the shafts on which they are mounted so as to again cause the partially formed ring to be moved between them and the flange to be turned about the entire inner periphery of the ring. Of course, since the inner periphery is interrupted by the metal strip 75, this is necessarily done intermittently. In fact, the motor 47 must be reversed to cause the rollers to pull the inner peripheral portions of the ring back and forth between them.

At this time, the ring is removed from between the grooves 71 and 74 and disposed between the grooves 72 and 73, as shown in FIG. 9. For this purpose, roller 37c is backed off from the roller 37a to permit the partially formed ring to be lowered opposite the grooves 72 and 73. Then, upon a repetition of the procedure above described, the flange F' is turned down upon the inner peripheral portion of the gasket and shield 70 so as to complete the forming of the inner and outer peripheries of the ring. That is, the rollers are again rotated to move the ring back and forth between them as the roller 37c is gradually moved toward the roller 37a.

It will be appreciated that although the grooves 72 and 73 are disposed on a lower horizontal level than the grooves 71 and 74, the ring R can rest on the top of the base with its peripheral portions disposed between either set of grooves. Thus, there is of course some flexibility in the ring, and, as can be seen from FIG. 5, this difference in horizontal level is of a relatively minor extent. As shown in FIGS. 5 and 6, during turning of the flange F down in the manner above described, the partially formed ring R of the sheet metal is disposed on the base 20 to the right of its position shown in FIGS. 1 and 2. However, as can be seen in FIGS. 5 and 6, it is necessary in working with rings of this range of diameter for at least part of the left-hand portion of the ring to be received with opening 27.

Upon completion of the turning of the flange F', and as can be seen from FIG. 10, the sheet metal strip 75 is disposed between a third set of rollers including the roller 37a on the shaft 25b and a roller 37d which replaces the roller 37c on the shaft 25a. That is, the head is maintained in position shown in FIGS. 5 and 6, wherein these shafts are upright, and the partially formed gasket is supported on at least approximately the same horizontal level as it is supported during the turning of the flanges F and F'. As can be seen from FIG. 10, the left-hand portion of the partially formed ring is disposed above guide 31 on the top 24 of the table. If the ring is not sufficiently flexible to permit its left-hand portion to dip into a supported position on the guide, the rods 35 may be raised to provide the required support.

As can be seen from FIG. 11, roller 37d is identical to roller 37a in that it has a lower substantially rectangular groove 73 and an upper curved groove 74. In the turning of flanges on opposite sides of the sheet metal strip 75 up and then down on the top of the shield 77, the roller 37d is moved to the right so as to receive the metal strip between the grooves 74. This roller is then moved back to the left, and the two rollers are then rotated on the shafts so as to gradually pull the sheet metal strip between them and at the same time force the roller 37d toward the roller 37a so as to gradually turn a flange up on the opposite peripheral portions of the strip 75. For this purpose, of course, it is usually necessary to run the peripheral portions of the strip 75 back and forth between the rollers by reversing the rotation of the shafts.

After the flanges are partially formed on the strip 75, they are turned further up and then down by placing them between the substantially rectangular grooves 73 beneath the grooves 74. This is performed in a manner from the foregoing description in connection with the turning up and then turning down of the inner peripheral flange F' of the ring. In the case of the reinforcing strip, of course, the flanges on the opposite peripheral edges of the strip are turned up and then down simultaneously.

Guide rollers 78 are carried on the head and have grooves about their outer ends for engaging the peripheral portions of the ring, as shown in FIG. 6. For this purpose, these guide rollers are swingably mounted on the head to permit them to move toward and away from the peripheral portion of the gasket to be guided. As can be seen from FIG. 10, these guide rollers may also be used in guiding the opposite edges of the strip 75 during turning up of flanges on it.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A machine for use in forming a sheet metal ring having flanges turned about its inner and outer peripheries, respectively, comprising a base to support a circular sheet of metal in a substantially horizontal position, means on the base for releasably clamping the center of the sheet for rotation about a vertical axis, a head having a pair of parallel shafts rotatably mounted thereon, means mounting the head on one side of the base for swinging between a first position in which the axes of the shafts are perpendicular to the axis of rotation of the sheet and a second position in which said axes are parallel thereto, rollers having flange forming surfaces thereon and fittable on said shafts for receiving between them the outer periphery of the sheet, when said sheet is clamped on the base and said head is in its first position, and for receiving between them said flange and the inner periphery of a ring cut from said sheet, when said head is in the second position and said ring is supported on the base on substantially the same horizontal level as the sheet, and means for rotating the rollers to force the outer and inner peripheries of the sheet and ring, respectively, through the forming surfaces thereon so as to turn said flanges thereabout.

2. A machine for use in forming a sheet metal ring having outwardly and inwardly turned flanges about its inner and outer peripheries, respectively, comprising a base having means thereon for releasably mounting the center of a circular sheet of metal for rotation about a vertical axis, a head having a pair of parallel shafts thereon, means for rotating the shafts in opposite directions and moving their axes relatively toward and away from one another, a first set of rollers fittable over said shafts for rotation therewith and having their outer surfaces contoured to form an inwardly turned flange on the outer periphery of the sheet when said outer periphery is received between the rollers and said shafts are rotated and moved toward one another, a second set of rollers fittable over the shafts for rotation therewith and having their outer surfaces contoured to form and outwardly turned flange on the inner periphery of a ring cut from said sheet when said inner periphery and said inwardly turned flange on its outer periphery are received between said rollers and said shafts are rotated and moved toward one another, and means for swinging said head between a first position in which said first set of rollers is disposed to receive said outer periphery of the sheet when the center of said sheet is releasably mounted on said base and a second position in which said second set of rollers is disposed to receive said inner periphery and inwardly turned flange of the ring when said ring is supported on the base on substantially the same horizontal level said sheet is supported.

3. A machine for use in forming a sheet metal ring having outwardly and inwardly turned flanges about its inner and outer peripheries, respectively, comprising a base, means on the base for clamping the center of a substantially horizontally disposed circular sheet to support said sheet for rotation about a vertical axis, a head having a pair of parallel shafts thereon, means for rotating the shafts in opposite directions about their longitudinal axes and moving them relatively toward and away from one another, rollers fittable over the shafts for rotation therewith and having their outer surfaces contoured to turn flanges on peripheral portions of said sheet as said rollers are rotated with said portions received therebetween, and means mounting the head on one side of the base for swinging between a first position in which the rollers on said shafts are disposed with their axes horizontal to receive the outer periphery of the clamped sheet and a second position in which the rollers on said shaft are positioned with their axes vertical to receive spaced apart peripheral portions of a ring cut from said sheet and supported on said base on substantially the same horizontal level that it is held when clamped thereon.

4. A machine of the character defined in claim 3, wherein said clamping means comprises upper and lower legs having a horizontally extending opening between them for receiving one side of the clamped sheet and supported ring, and means for moving the clamping means toward and away from the head.

5. A machine of the character defined in claim 3, wherein the rollers include one set having their outer surfaces contoured to form an inwardly turned flange on the outer periphery of the sheet in the first position of the head and another set having their outer surfaces contoured to form an outwardly turned flange of the inner periphery of the ring in the second position of the head.

6. A machine of the character defined in claim 3, wherein the rollers include one set having their outer surfaces contoured to form an inwardly turned flange on the outer periphery of the sheet in the first position of the head and another set having their outer surfaces contoured to form oppositely turned flanges on the spaced peripheral portions of a strip of the ring extending across the opening thereof.

7. A machine of the character defined in claim 3, wherein, the rollers include a first set having their outer peripheries contoured to form an inwardly turned flange on the outer periphery of the sheet in the first position of the head, and second and third sets having their outer surfaces contoured to form, respectively, an outwardly turned flange on the inner periphery of the ring and oppositely turned flanges on spaced peripheral portions of a strip extending across the opening of the ring in the second position of the head.

References Cited

UNITED STATES PATENTS 1,782,641  11/1930  Wild _____ 72—101

FOREIGN PATENTS 455,942  4/1949  Canada.
345,204  10/1904  France.
889,063  2/1962  Great Britain.

CHARLES W. LANHAM, *Primary Examiner.*

K. C. DECKER, *Assistant Examiner.*